K. BÜCHNER AND F. STÖCKLEIN.
FOOTBALL AND OTHER SPORTBALL.
APPLICATION FILED NOV. 25, 1921.
1,436,630.
Patented Nov. 21, 1922.
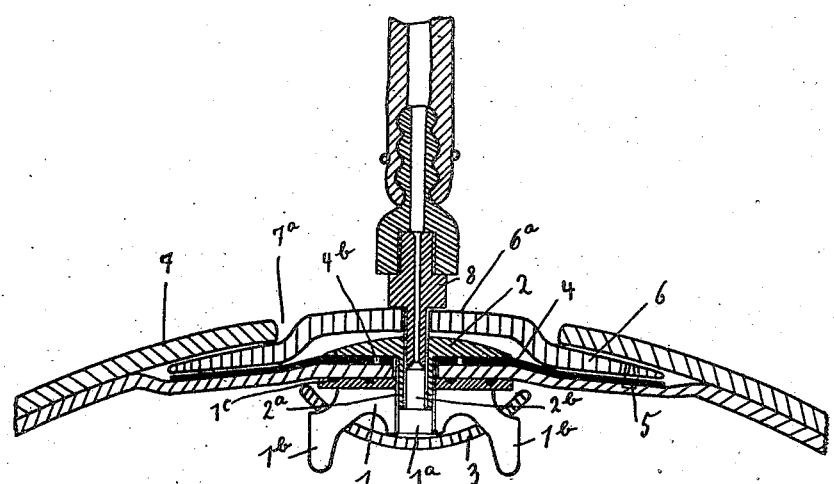
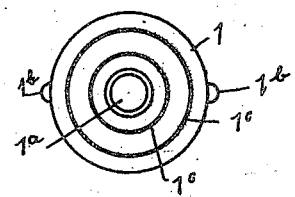
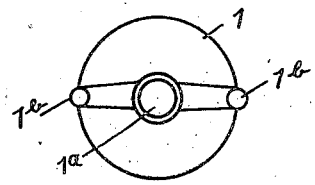
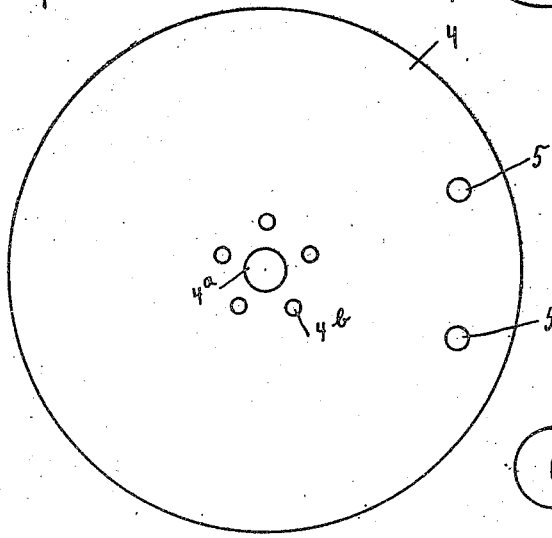
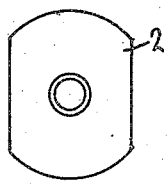
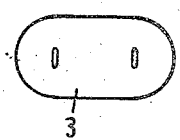

Patented Nov. 21, 1922.

1,436,630

UNITED STATES PATENT OFFICE.

KARL BÜCHNER AND FRITZ STÖCKLEIN, OF SCHWEINFURT, GERMANY.

FOOTBALL AND OTHER SPORTBALL.

Application filed November 25, 1921. Serial No. 517,955.

*To all whom it may concern:*

Be it known that we, KARL BÜCHNER and FRITZ STÖCKLEIN, citizens of the German Republic, residing at Schweinfurt, Germany, have invented certain new and useful Improvements in Footballs and Other Sportballs, of which the following is a specification.

This invention has for its object to avoid the lacing of the slot which is necessary at present for the insertion of the bladder into the leather envelope. This object is attained according to the invention by arranging upon the valve of the bladder a large disk which is adapted to be inserted through a hole of the envelope which corresponds in size with the valve of the bladder, said disk being pressed against the inner surface of the envelope when the bladder is being inflated so that it prevents the projecting of valve and of the bladder through the hole of the envelope.

In order that the invention may be clearly understood, we will proceed to describe the same with reference to the form of construction which is shown by way of example on the accompanying drawing, wherein:—

Fig. 1 shows in axial section the valve, a part of the envelope and of the bladder.

Fig. 2 is a top view of the lower valve disk.

Fig. 3 shows the lower valve disk seen from below.

Fig. 4 shows the upper valve disk seen from below.

Fig. 5 shows the elastic band for closing the valve.

Fig. 6 is a plan view of the large disk for closing the opening in the envelope.

The valve consists of two disks 1, 2 and of a rubber band 3. The lower valve disk which is in contact with the inner surface of the bladder has a central threaded boring $1^a$ designed to receive an externally threaded stud $2^a$ of the upper valve disk 2, so that if the stud $2^a$ is screwed into the boring $1^a$ the bladder is securely clamped in between the two disks. The lower valve disk 1 has further two downwardly projecting noses $1^b$ (arranged at the ends of a diameter) which are designed to hold the rubber band 3 which obturates the lower end of the central boring $1^a$. The central stud $2^a$ of the upper valve disk is tubular and its boring $2^b$ is threaded so that a stopper or a perforated socket for the air pump can be screwed into said central tubular stud $2^a$. In the upper surface of the lower valve disk 1 annular grooves $1^c$ are arranged.

A large disk 4 is of considerably larger diameter than the valve disks. Around the central hole $4^a$ for the tubular stud $2^a$ of valve disk 2 holes $4^b$ are arranged in a circle. These holes $4^b$ serve together with the annular grooves $1^c$ of the lower valve disk 1 for securely connecting the bladder with the valve, as the rubber of the bladder is pressed into the holes and into the annular grooves when the two valve disks are being screwed together.

The large steel disk 4 is fixed, by two rivets situated at one side of the disk but outside the valve disks, to a thick disk 6 of leather or other convenient material which is bulged out at the center part $6^a$. The diameter of this bulged out part $6^a$ corresponds with the inner diameter of the hole $7^a$ of the envelope 7.

If the bladder is not inflated the large steel disk 4, whose edge could be lined with metal or leather to avoid damaging of the bladder, can be bent so that it can be pulled out through the hole $7^a$ of the envelope together with the bladder and the valve. After the bladder and the valve with the accessory parts have been inserted in the envelope 7 a perforated socket 8 is screwed into the boring $2^b$ of the upper valve. After the bladder and the valve with the accessory parts have been inserted in the envelope 7 a perforated socket 8 is screwed into the boring $2^b$ of the upper valve disk 2 whereupon the air pump is screwed upon this socket. The bladder is inflated in the usual manner. When the bladder is being inflated the large steel disk 4 and the top disk 6 are gradually pressed against the inner surface of the envelope, the bulged out part $6^a$ of the top disk 6 being inserted in the hole $7^a$ until its outer surface is flush with the outer surface of the ball. After the bladder has been completely inflated the socket 8 is screwed out of the valve and a stopper can be screwed in to close the valve spring.

The bladder can be removed from the envelope together with the valve when the air has been let out of the bladder.

According to the invention the lacing of the hole in the envelope is avoided which is very advantageous as the lacing is rather difficult and requires much time, preventing besides the perfect equilibrium of the ball.

The ball improved according to this invention is perfectly round and balanced and it can be constructed to serve as football, punching ball, water ball or the like.

We claim:—

1. An improved sportball having an outer envelope with opening, an inner bladder, and a valve of said bladder designed for inflating the bladder when it has been inserted in the envelope, comprising in combination with the envelope having an opening, the bladder and the valve of the bladder, a thin disk of flexible material of larger diameter than the opening of the envelope directly connected with the valve of the bladder, said disk being designed to close the opening of the envelope automatically from the inside when the bladder is being inflated.

2. An improved sportball having an outer envelope with opening, an inner bladder, and a valve of said bladder designed for inflating the bladder when it has been inserted in the envelope, comprising in combination with the envelope having an opening, the bladder and the valve of the bladder, a disk of thin steel of larger diameter than the opening of the envelope connected with the valve of the bladder, said disk being designed to close the opening of the envelope automatically from the inside when the bladder is being inflated.

3. An improved sportball having an outer envelope with an opening, an inner bladder, and a valve of said bladder designed for inflating the bladder when it has been inserted in the envelope, comprising in combination with the envelope having an opening, the bladder and the valve of the bladder, a disk of flexible material of larger diameter than the opening of the envelope connected with the valve of the bladder and designed to close the opening of the envelope automatically from the inside when the bladder is being inflated, a second disk arranged upon said large flexible disk, and a bulged out central part of said second disk.

4. An improved sportball having an outer envelope with an opening, an inner bladder, and a valve of said bladder designed for inflating the bladder when it has been inserted in the envelope comprising in combination with the envelope having an opening, the bladder and the valve of the bladder, a disk of thin steel of larger diameter than the opening of the envelope connected with the valve of the bladder and designed to close the opening of the envelope automatically from the inside when the bladder is being inflated, a second disk arranged upon said large steel disk, and a bulged out central part of said second disk.

5. An improved sportball having an outer envelope with an opening, an inner bladder, and a valve of said bladder designed for inflating the bladder when it has been inserted in the envelope comprising in combination with the bladder, a disk of thin steel of larger diameter than the opening of the envelope connected with the valve of the bladder and designed to close the opening of the envelope automatically from the inside when the bladder is being inflated, a second disk arranged upon said large steel disk, a bulged out central part of said second disk, an outer valve disk upon the bladder, an inner valve disk in the bladder, a central tubular with internal threaded body downwardly projecting from the inner valve disk, two opposite projections of said central threaded (tubular) body, a screw threaded tubular body downwardly projecting from the outer valve disk screwed into the central tubular body of the inner valve disk and a rubber band serving as valve held by said two projections and closing the lower end of said tubular body of the inner valve disk.

In testimony whereof we affix our signatures in presence of two witnesses.

KARL BÜCHNER.
FRITZ STÖCKLEIN.

Witnesses:
YAK ZRÄNDLEIN,
HCH. BRÄNDHEIN.